United States Patent
Grafenburg et al.

(10) Patent No.: US 12,236,815 B2
(45) Date of Patent: Feb. 25, 2025

(54) ILLUMINATION DEVICE AND METHOD FOR TURNING ON OR TURNING OFF A FIRST AND/OR A SECOND LASER DIODE OF AN ILLUMINATION DEVICE

(71) Applicant: Robert Bosch GmbH, Stuttgart (DE)

(72) Inventors: Christian Adam Grafenburg, Stuttgart (DE); Moritz Esslinger, Leonberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 18/508,126

(22) Filed: Nov. 13, 2023

(65) Prior Publication Data

US 2024/0257677 A1  Aug. 1, 2024

(30) Foreign Application Priority Data

Jan. 27, 2023 (DE) .................... 10 2023 200 658.8

(51) Int. Cl.
*G09G 3/00* (2006.01)
*G02B 27/01* (2006.01)

(52) U.S. Cl.
CPC ......... *G09G 3/003* (2013.01); *G02B 27/0172* (2013.01); *G02B 2027/0112* (2013.01); *G02B 2027/0174* (2013.01); *G02B 2027/0178* (2013.01); *G09G 2320/0666* (2013.01)

(58) Field of Classification Search
CPC ........... G09G 3/003; G09G 2320/0666; G02B 27/0172; G02B 2027/0112; G02B 2027/0174; G02B 2027/0178
See application file for complete search history.

(56) References Cited

U.S. PATENT DOCUMENTS

| 2017/0279246 A1 | 9/2017 | Muendel et al. |
| 2019/0229495 A1* | 7/2019 | Pierer .................... G02B 27/01 |
| 2020/0201154 A1* | 6/2020 | Sugiyama ............ G03B 21/204 |

FOREIGN PATENT DOCUMENTS

| DE | 102015119329 A1 | 5/2017 |
| DE | 102018010364 A1 | 1/2020 |
| DE | 102021130538 A1 | 5/2023 |

* cited by examiner

*Primary Examiner* — Peter D McLoone
(74) *Attorney, Agent, or Firm* — NORTON ROSE FULBRIGHT US LLP; Gerard A. Messina

(57) ABSTRACT

A method for turning on or off a first and/or a second laser diode of an illumination device. A first laser diode of the illumination device for emitting a first light beam within a first wavelength range is turned on by a control unit of the illumination device. The first wavelength range changes depending on a temperature of the first laser diode. The first laser diode is turned off by the control unit depending on a comparison of a first wavelength value of the first light beam emitted by the first laser diode with a first wavelength threshold value. A second laser diode of the illumination device for emitting a second light beam within a second wavelength range is turned on or left on by the control unit at the second point in time depending on the comparison of the first wavelength value with the first wavelength threshold value.

16 Claims, 4 Drawing Sheets

ILLUMINATION DEVICE AND METHOD FOR TURNING ON OR TURNING OFF A FIRST AND/OR A SECOND LASER DIODE OF AN ILLUMINATION DEVICE

CROSS REFERENCE

The present application claims the benefit under 35 U.S.C. § 119 of German Patent Application No. 10 2023 200 658.8 filed on Jan. 27, 2023, which is expressly incorporated herein by reference in its entirety.

FIELD

The present invention relates to an illumination device, in particular of a projector unit. The present invention further relates to an optical system having the illumination device and a method for turning on or turning off a first and/or a second laser diode of an illumination device.

BACKGROUND INFORMATION

German Patent Application No. DE 10 2018 010 364 A1 describes a method for tuning a laser diode (active cooling and heating).

It is an object of the present invention to provide an illumination device that does not require such active cooling and heating and still provides a constant wavelength range of the emitted light beam.

SUMMARY

To achieve the object, an illumination device according to the present invention is provided. Furthermore, an optical system and a method for turning on or turning off a first and/or a second laser diode of an illumination device according are provided according to the present invention.

According to an example embodiment of the present invention, the illumination device, in particular a projector unit, comprises at least a first laser diode for emitting a first light beam within a first wavelength range. In this regard, the first wavelength range changes, in particular shifts, depending on a temperature of the first laser diode, in particular the temperature of at least a first laser cavity of the first laser diode. In the process, the temperature of the first laser diode can in particular change depending on an operational status of the first laser diode or also depending on the ambient temperature of the first laser diode. The illumination device further comprises a second laser diode for emitting a second light beam within a second wavelength range. The second wavelength range changes, in particular shifts, here as well, depending on a temperature of the second laser diode, in particular the temperature of at least a second laser cavity of the second laser diode. The temperature of the second laser diode can also change here depending on an operational status of the second laser diode or also depending on the ambient temperature of the second laser diode. The illumination device further comprises a first sensor for acquiring at least one piece of information concerning the, in particular current, first wavelength range of the emitted first light beam. The illumination device further comprises a control unit which is designed to determine the, in particular current, first wavelength range depending on the information concerning the, in particular current, first wavelength range sensed by the first sensor. Furthermore, the control unit is designed to turn on the first laser diode at a first point in time. Moreover, the control unit serves to turn off the first laser diode at a second point in time following the first, depending on a comparison of a first wavelength value, in particular a maximum value, of the determined wavelength range with a first wavelength threshold value. Furthermore, the control unit serves to turn on the second laser diode or alternatively to leave it turned on. The control unit is further designed to select the first wavelength threshold value such that the first light beam emitted by the first laser diode or the second light beam emitted by the second laser diode always lies within a third, constant wavelength range. The illumination device thus offers the possibility of always supplying a constant, third wavelength range of the light beam emitted by the illumination device by turning off or turning on the first or second laser diode.

Preferably, according to an example embodiment of the present invention, the first sensor is designed as a first temperature sensor. Here, the first temperature sensor is designed to sense the temperature of the first laser diode, in particular the temperature of at least the first laser cavity. The control unit is then designed in particular to determine the associated first wavelength range using a lookup table. Alternatively, the first sensor is designed as a first optical spectrometer. The spectral data sensed by the spectrometer can be directly used by the control unit to determine the, in particular current, first wavelength range. As another alternative, the first sensor is designed as a band pass filter with a downstream photodiode. The control unit can thus determine whether the current first wavelength range is within the constant third wavelength range provided.

According to an example embodiment of the present invention, preferably, the first wavelength range and the second wavelength range substantially coincide at the first point in time. In this case, the control unit is in particular designed to turn on the second laser diode at the second point in time, depending on the comparison of the first wavelength value, in particular the maximum value, of the determined, in particular current, first wavelength range with the first wavelength threshold value. Alternatively, the first and the second wavelength ranges are different at the first point in time. In this case, the control unit is preferably designed to turn on the first and the second laser diodes at the first point in time. In this connection, the, in particular current, second wavelength range at the second point in time corresponds to the first wavelength range at the first point in time. Alternatively, the control unit is designed to only turn on the first laser diode at the first point in time. Also, not only the active operating status of the respective laser diode, but the ambient temperature can also lead to an increase in the temperature of the respective laser diode, and thus to a change in the respective wavelength range. In this case, the second laser diode is only turned on at the second point in time.

Preferably, according to an example embodiment of the present invention, the illumination device also comprises a second sensor for acquiring at least one piece of information concerning the, in particular current, second wavelength range of the emitted second light beam. In this connection, the control unit is designed to determine the, in particular current, second wavelength range depending on the information acquired by the second sensor about the, in particular current, second wavelength range. Furthermore, the control unit serves to turn off the second laser diode and to turn on the first laser diode at a third point in time following the second, depending on a comparison of a second wavelength value, in particular a maximum value, of the determined, in particular current, second wavelength range with a second wavelength threshold value or the first wavelength threshold value. Thus, if the temperature of the second laser diode has increased so far that its second wavelength range threatens to fall outside of the third wavelength range, the by now cooled first laser diode can be re-used. This results in a repeating cycle comprising a constant third wavelength range of the first or second emitted light beam.

Preferably, according to an example embodiment of the present invention, the first and the second wavelength range correspond to a red, green, blue, or infrared wavelength range.

Preferably, according to an example embodiment of the present invention, the first and the second laser diodes are arranged separately from one another, in particular spatially. In this connection, it is preferably provided that the first and the second laser diodes are arranged in different housings with separate thermal discharge paths. This has the advantage that the thermal discharge of one laser diode in the turned-on state does not affect the temperature of the other, possibly turned-off laser diode. Alternatively, the first and the second laser diodes are arranged directly adjacent to one another, in particular in a common housing. As a result, as little design space as possible is required for the two laser diodes.

A further subject matter of the present invention is an optical system, in particular for a virtual retinal display. According to an example embodiment of the present invention, the optical system comprises a projector unit having the illumination device described above as well as a first controllable deflection unit for the at least one first light beam or the second light beam in order to provide scanning projection of the image content. The optical system further comprises a redirecting unit onto which the image content can be projected and which is configured to direct the projected image content onto an eye of a user.

Preferably, according to an example embodiment of the present invention, the redirecting unit is designed as a holographic optical element having a defined diffraction efficiency range. The diffraction efficiency range of the holographic optical element is in particular meant to indicate the range within which the holographic optical element redirects or diffracts a light beam incident to the holographic optical element depending on the angle of incidence and/or the wavelength. Here, the control unit is designed to turn on a first laser diode of the illumination device at a first point in time. The control unit also serves to turn off, at a second point in time following the first, the first laser diode depending on a comparison of a first wavelength value, in particular a maximum value, of a, in particular current, first wavelength range, determined by the control unit, of a first light beam emitted by the first laser diode with a first wavelength threshold value. In this connection, the control unit is further designed to turn on a second laser diode of the illumination device or, alternatively, to leave it turned on. The control unit is further designed to select the first wavelength threshold value such that the first light beam emitted by the first laser diode or the second light beam emitted by the second laser diode always lies within a third, constant wavelength range. In this regard, the third, constant wave range overlaps with the diffraction efficiency range of the holographic optical element such that the at least one first or second light beam incident upon the holographic optical element is directed toward the eye of the user at least with a determined, defined diffraction efficiency. This ensures that, depending on the respective use of the optical system, the projected image content is always available with sufficient brightness on the eye of the user. Preferably, the optical system is designed as a pair of smart glasses. In this connection, it is particularly provided that the third, constant wave range overlaps with the diffraction efficiency range of the holographic optical element such that at least 0.5%, preferably at least 1%, more preferably at least 5%, of the at least one first or second light beam incident upon the holographic optical element is directed onto the eye of the user. Preferably, the optical system also comprises a third temperature sensor designed to sense a temperature of the holographic optical element, in particular a surface temperature of the holographic optical element. In this connection, the control unit is designed to additionally select the first and/or second wavelength threshold value depending on the temperature of the holographic optical element sensed by the third temperature sensor. The temperature of the holographic optical element has an impact on the diffraction efficiency range of the holographic element. Accordingly, it is advantageous to also select the respective wavelength threshold value depending on the temperature of the holographic optical element in order to always allow a sufficient overlap of the third constant wavelength range with the diffraction efficiency range.

According to an example embodiment of the present invention, a further object of the present invention is a method of turning on or turning off a first and/or a second laser diode of an illumination device. This is in particular the illumination device described above. Initially, at a first point in time, a first laser diode of the illumination device for emitting a first light beam within a first wavelength range is turned on by a control unit of the illumination device. Here, the first wavelength range changes, i.e., shifts, depending on a temperature of the first laser diode, in particular the temperature of at least one first laser cavity of the first laser diode. In a further method step, at a second point in time following the first point in time, the first laser diode is turned off depending on a comparison of a first wavelength value, in particular a maximum value, of a, in particular current, first wavelength range, determined by the control unit of the illumination device, of the first light beam emitted by the first laser diode with a first wavelength threshold value. Furthermore, a second laser diode of the illumination device for emitting a second light beam within a second wavelength range is turned on by the control unit, or alternatively left on, at the second point in time depending on the comparison of the first wavelength value with the first wavelength threshold value. Here, the first wavelength threshold value is selected by the control unit such that the first light beam emitted by the first laser diode or the second light beam emitted by the second laser diode always lies within a third, constant wavelength range.

DETAILED DESCRIPTION OF EXAMPLE EMBODIMENTS

Figure 1:
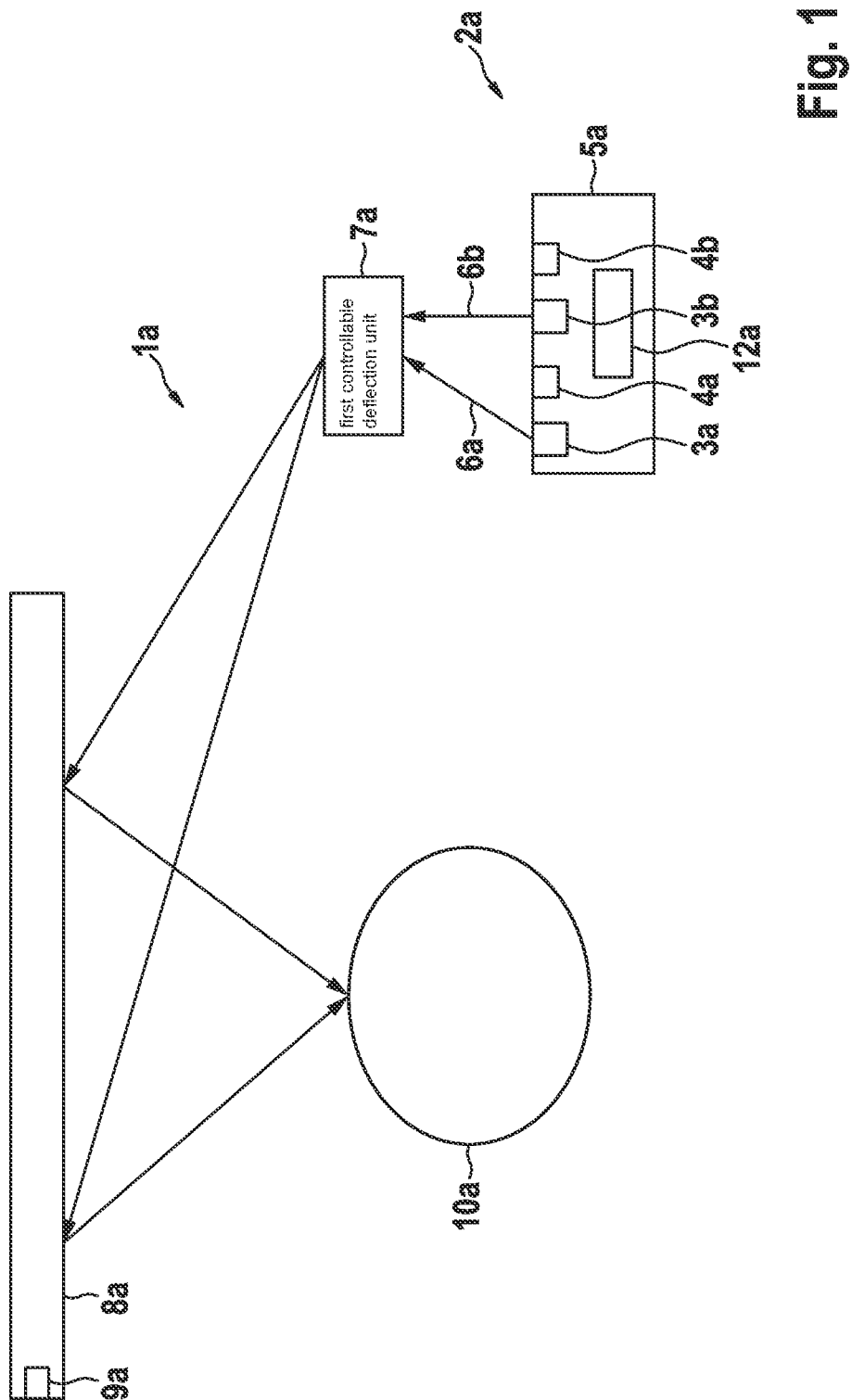
FIG. 1 shows an optical system for a virtual retinal display, according to an example embodiment of the present invention.

FIG. 1 schematically shows an optical system 1a for a virtual retinal display, which in this embodiment is designed as a pair of smart glasses. The optical system 1a comprises a projector unit 2a having an illumination device 5a. The illumination device 5a comprises a first laser diode 3a for emitting a first light beam 6a within a first wavelength range. Here, the first wavelength range changes, i.e., shifts, depending on a temperature of the first laser diode 3a, in particular the temperature of at least one first laser cavity of the first laser diode 3a, the first laser cavity not being shown here. The illumination device 5a further comprises a second laser diode 3b for emitting a second light beam 6b within a second wavelength range. Here, the second wavelength range changes, i.e., shifts, depending on a temperature of the second laser diode 3b, in particular the temperature of at least one second laser cavity of the second laser diode 3b, the second laser cavity not being shown here. The illumination device 5a further comprises a first sensor 4a for acquiring at least one piece of information concerning the, in particular current, first wavelength range of the transmitted first light beam 6a. The illumination device 5a further comprises a control unit 12a which is designed to determine the, in particular current, first wavelength range depending on the information concerning the, in particular current, first wavelength range sensed by the first sensor 4a. The control unit 12a is further designed to turn on the first laser diode 3a at a first point in time. The control unit 12a also serves to turn off the first laser diode 3a at a second point in time following the first, and to turn on the second laser diode 3b or leave it turned on, depending on a comparison of a first wavelength value, in particular a maximum value, of the determined, in particular current, first wavelength range with a first wavelength threshold value. The control unit 12a further serves to select the first wavelength threshold such that the first light beam 6a emitted by the first laser diode 3a or the second light beam 6b emitted by the second laser diode 3b always lies within a third, constant wavelength range. The projector unit 2a further comprises a first controllable deflection unit 7a for the at least one first light beam 6a or the second light beam 6b for providing scanning projection of the image content. The optical system 1a further comprises a redirecting unit 8a onto which the image content may be projected and which is configured to direct the projected image content onto an eye 10a of a user.

In this embodiment of the optical system 1a, the first sensor 4a is designed as a temperature sensor that senses the temperature of the first laser diode 3a, in particular the temperature of the at least one first laser cavity of the first laser diode 3a.

In this embodiment, the illumination device 5a further comprises a second sensor 4b for acquiring at least one piece of information concerning the, in particular current, second wavelength range of the emitted second light beam 6b. In this embodiment, the second sensor 4b is designed as a second optical spectrometer. In this connection, the control unit 12a is designed to determine the, in particular current, second wavelength range using the information acquired by the second sensor 4b concerning the, in particular current, second wavelength range. The control unit 12a further serves to turn off the second laser diode 3b at a third point in time following the second, and to turn the first laser diode 3a back on, depending on a comparison of a second wavelength value, in particular a maximum value, of the determined, in particular current, second wavelength range with a second wavelength threshold value or the first wavelength threshold value.

In this embodiment, the first and second wavelength ranges correspond to a red wavelength range. Alternatively, the first wavelength range and the second wavelength range may also correspond to a green, blue, or infrared wavelength range.

In this embodiment, the first laser diode 3a and the second laser diode 3b are arranged directly adjacent to each other, in particular in a common housing.

In the illustrated embodiment of the optical system 1a, the redirecting unit 8a is designed as a holographic optical element having a defined diffraction efficiency range. In this connection, the control unit 12 is also designed to select the first wavelength threshold such that the third, constant wave range overlaps with the diffraction efficiency range of the holographic optical element in such a way that the at least a first light beam 6a or second light beam 6b incident upon the holographic optical element is directed toward the eye 10a of the user at least with a determined, defined diffraction efficiency.

Moreover, in this embodiment, the optical system 1a comprises a third temperature sensor 9a which is designed to sense a temperature of the holographic optical element, in particular a surface temperature of the holographic optical element. In this connection, the control unit 12a is designed to additionally select the first and/or second wavelength threshold value depending on the temperature of the holographic optical element sensed by the third temperature sensor 9a.

Figure 2:
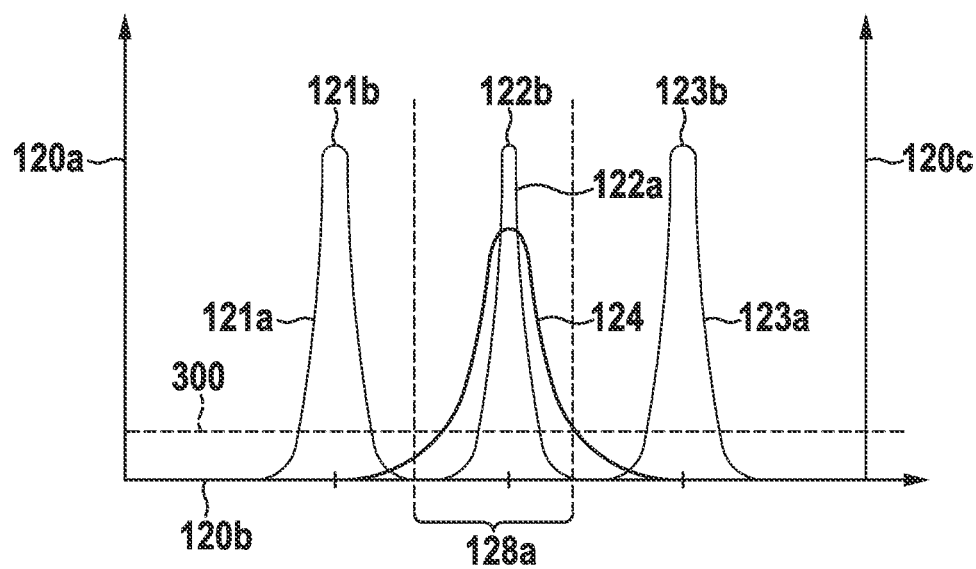
FIG. 2 shows the temperature-dependent change of the first and second wavelength range in a first embodiment of an illumination device, according to an example embodiment of the present invention.

FIG. 2 shows, in a diagram, the temperature-dependent change of the first wavelength range 122a and 123a and of the second wavelength range 121a in a second embodiment of an illumination device. Here, the laser power of the first and second laser diodes is plotted on the first Y-axis 120c. The time is plotted on the X-axis 120b. At the first point in time, the first laser diode has a first wavelength range 122a, the maximum value 122b of which is at about 540 nm in this embodiment. In this exemplary embodiment, the first laser diode heats up by 30K due to the active operating status such that the first wavelength range changes, i.e., shifts, by 10 nm by the second point in time. At the second point in time, the first wavelength range in this exemplary embodiment correspondingly has a maximum value 123b at 550 nm. The second laser diode was also turned on at the first point in time (but without emitting a second light beam onto the redirecting element) and initially has a maximum value 121b of the second wavelength range 121a at about 530 nm. By the second point in time, the second laser diode also heats up by 30K accordingly. Thus, the initial second wavelength range 121a has also changed, i.e., shifted, and is located at a maximum value of 540 nm at the second point in time. This corresponds to the first wavelength range 122a at the first point in time. By turning off the first laser diode and turning on the second laser diode at the second point in time, it is thus possible that the first light beam emitted by the first laser diode or the second light beam emitted by the second laser diode always lies within a third, constant wavelength range 128a. Alternatively, it is also possible that the change in the wavelength ranges shown is due to an ambient temperature that is higher than that of the laser diodes. In this embodiment, on the second Y-axis 120a, a diffraction efficiency of a holographic optical element is shown as a redirecting unit onto which the image content may be projected and which is configured to direct the projected image content onto an eye of a user. The diffraction efficiency range 124 associated with the holographic optical element defines, using a diffraction efficiency threshold 300, the third constant wavelength range 128a such that the at least one first or second light beam incident upon the holographic optical element is directed toward the eye of the user at least with a determined, defined diffraction efficiency 300.

Figure 3:
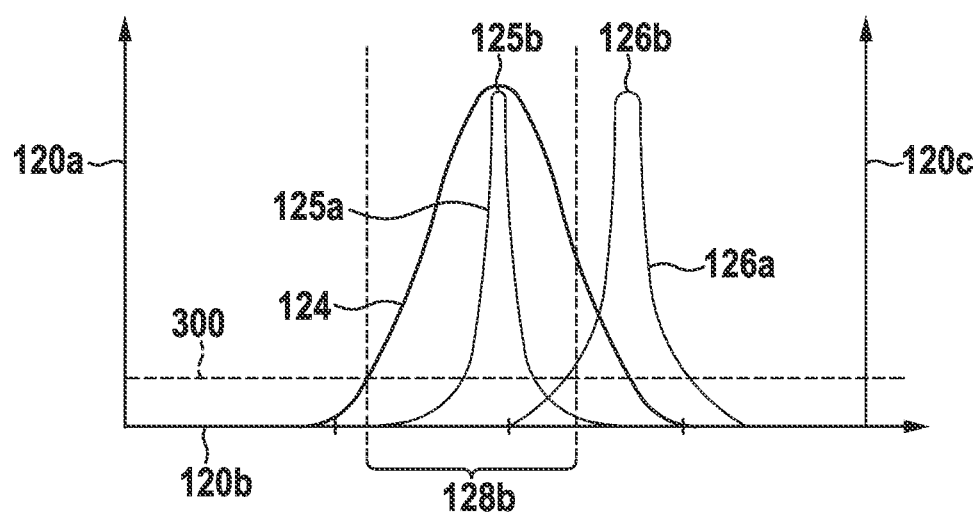
FIG. 3 shows the temperature-dependent change of the first and second wavelength range in a second embodiment of an illumination device, according to an example embodiment of the present invention.

FIG. 3 shows, in a diagram, the first wavelength range 126a and the second wavelength range 125a of the respective laser diode at the second point in time. In contrast to FIG. 2, the first wavelength range 126a here substantially coincides with the maximum value 126b and the second wavelength range 125a coincides with the maximum value 125b at the first point in time. If, as shown in FIG. 3, the first wavelength range 126a has changed due to the operating temperature such that the diffraction efficiency range 124 no longer sufficiently overlaps with the first wavelength range 126a, the first laser diode is turned off and the second laser diode having the second wavelength range 125a is turned on. Thus, it is always ensured that at all times at least one laser beam is in the wavelength range 128b within which the diffraction efficiency of the diffraction efficiency range 124 is always at least equal to or exceeds the diffraction efficiency threshold 300.

Figure 4:
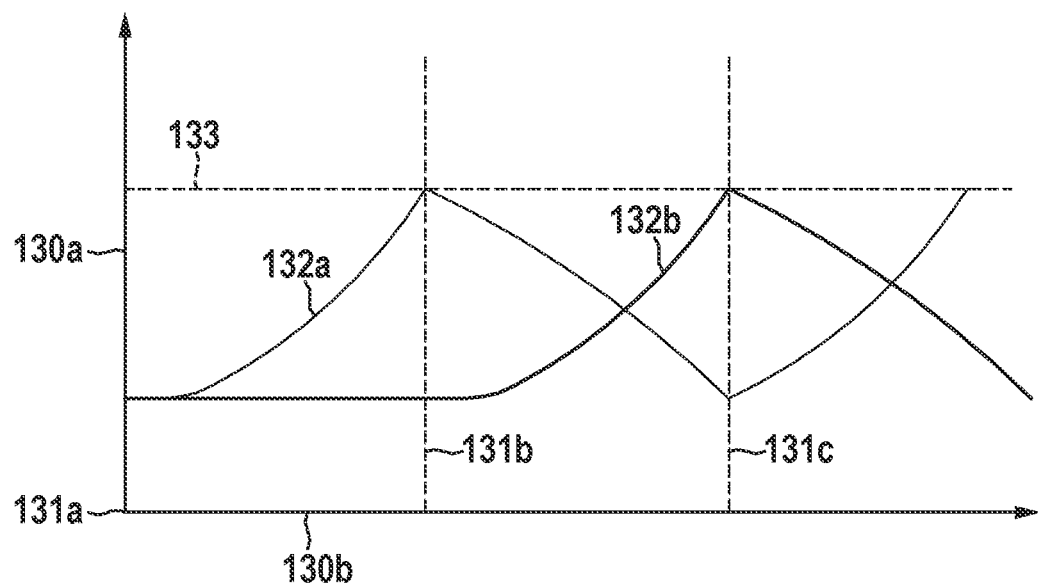
FIG. 4 shows the controlling of the first and second laser diode at a first and a second point in time using the control unit, according to an example embodiment of the present invention.

FIG. 4 shows a way to control the first and second laser diodes at different points in time using the control unit of the illumination device. The wavelength of the maximum value of a first or second wavelength range is plotted on the Y-axis 130a. The time is plotted on the X-axis 130b. At the first point in time 131a, the maximum value 132a of the first wavelength range and the maximum value 132b of the second wavelength range coincide. Accordingly, a situation comparable to the initial situation at the first point in time 131a prevails in FIG. 3. The first laser diode is turned on by the control unit at the first point in time 131a so that its operating temperature, and thus the maximum value 132a of the first wavelength range, increases. At the first point in time 131b, the maximum value 132a of the first wavelength range reaches a first wavelength threshold value 133. The control unit now turns off the first laser diode and turns on the second laser diode. This causes the operating temperature of the second laser diode to increase, and therefore also the maximum value 132b of the second wavelength range, to increase. The operating temperature of the first laser diode now decreases in turn, causing the maximum value 132a of the first wavelength range to also decrease. At a third point in time 131c, the maximum value of the second wavelength range in turn reaches the first wavelength threshold value 133. The control unit now turns on the first laser diode and turns the second laser diode back off. This continuously ensures that the first light beam emitted by the first laser diode or the second light beam emitted by the second laser diode always lies within a third, constant wavelength range.

Figure 5:
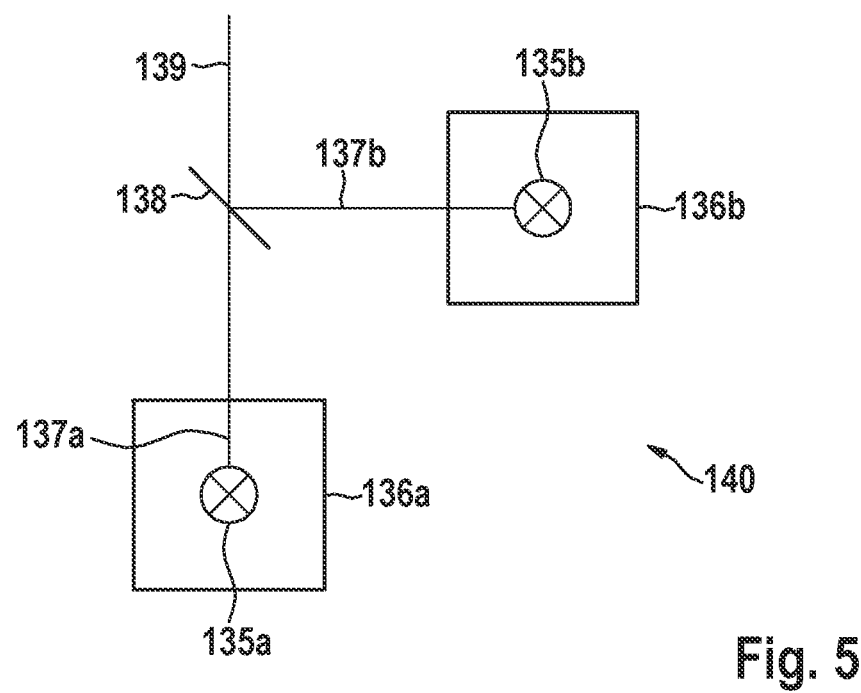
FIG. 5 shows a possible arrangement of the first and second laser diode in the illumination device, according to an example embodiment of the present invention.

FIG. 5 schematically shows another embodiment of the illumination device 140. Here, the first laser diode 135a and the second laser diode 135b are arranged spatially separated from one another in different housings and with separate thermal discharge systems 136a and 136b. The first light beam 137a and the second light beam 137b are merged via a semi-permeable mirror 138 so that the further beam path 139 is the same and the laser diodes 135a and 135b may thereby alternate.

Figure 6:
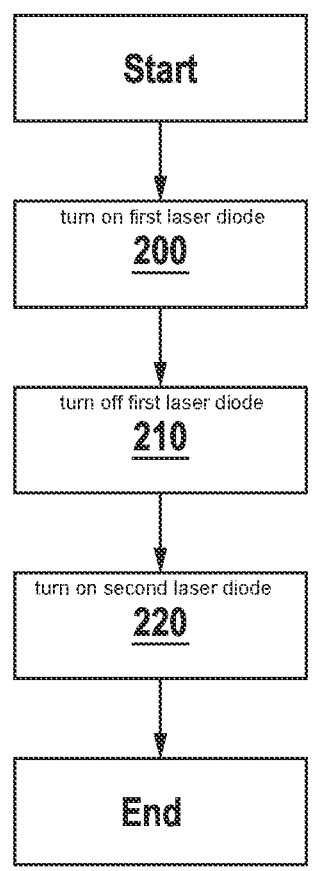
FIG. 6 shows a method of turning on or turning off a first and/or a second laser diode of an illumination device, according to an example embodiment of the present invention.

FIG. 6 shows, in the form of a flow diagram, a method for turning on or turning off a first and/or a second laser diode of an illumination device. In a first method step 200, at a first point in time a first laser diode of the illumination device is turned on by a control unit of the illumination device in order to emit a first light beam within a first wavelength range. Here, the first wavelength range changes, i.e., shifts, depending on a temperature of the first laser diode, in particular the temperature of at least one first laser cavity of the first laser diode. In a further method step 210, at a second point in time following the first point in time, the first laser diode is turned off depending on a comparison of a first wavelength value, in particular a maximum value, of a, in particular current, first wavelength range, determined by the control unit, of the first light beam emitted by the first laser diode with a first wavelength threshold value. Furthermore, in another method step 220, a second laser diode of the illumination device for emitting a second light beam within a second wavelength range is turned on or switched on or left on depending on the comparison of the first wavelength value with the first wavelength threshold value. Here, the first wavelength threshold is selected by the control unit such that the first light beam emitted by the first laser diode or the second light beam emitted by the second laser diode always lies within a third, constant wavelength range. Thereafter, the method ends.

What is claimed is:

1. An illumination device, comprising:
   a first laser diode configured to emit a first light beam within a first wavelength range, the first wavelength range changing depending on a temperature of at least one first laser cavity of the first laser diode;
   a second laser diode configured to emit a second light beam within a second wavelength range, the second wavelength range changing depending on a temperature of at least one second laser cavity of the second laser diode;
   a first sensor configured to acquire at least one piece of information concerning a current first wavelength range of the emitted first light beam; and
   a control unit configured to determine the current first wavelength range depending on the information acquired by the first sensor concerning the current first wavelength range, wherein the control unit is configured to turn on the first laser diode at a first point in time, and to turn off the first laser diode at a second point in time following the first point in time, depending on a comparison of a first wavelength value of the determined current first wavelength range with a first wavelength threshold value, and to turn on or leave on the second laser diode, wherein the control unit is configured to select the first wavelength threshold value such that the first light beam emitted by the first laser diode or the second light beam emitted by the second laser diode always lies within a third, constant wavelength range.

2. The illumination device according to claim 1, wherein the illumination device is a projector.

3. The illumination device according to claim 1, wherein the first sensor is a first temperature sensor.

4. The illumination device according to claim 1, wherein the first sensor is a first optical spectrometer.

5. The illumination device according to claim 1, wherein the first wavelength range and the second wavelength range substantially coincide at the first point in time.

6. The illumination device according to claim 1, wherein the first wavelength range and the second wavelength range are different at the first point in time.

7. The illumination device according to claim 6, wherein the control unit is configured to turn on the first laser diode and the second laser diode at the first point in time, wherein a current second wavelength range at the second point in time corresponds to the first wavelength range at the first point in time.

8. The illumination device according to claim 1, wherein the illumination device further comprises a second sensor configured to acquire at least one piece of information concerning a current second wavelength range of the emitted second light beam, wherein the control unit is configured to determine the current second wavelength range depending on the information acquired by the second sensor concerning the current second wavelength range, and, at a third point in time following the second, to turn off the second laser diode and turn on the first laser diode depending on a comparison of a second wavelength value of the determined current second wavelength range with a second wavelength threshold value or the first wavelength threshold value.

9. The illumination device according to claim 1, wherein the first wavelength range and the second wavelength range correspond to a red or green or blue or infrared wavelength range.

10. The illumination device according to claim 1, wherein the first laser diode and the second laser diode are separated spatially.

11. The illumination device according to claim 1, wherein the first laser diode and the second laser diode are arranged directly adjacent to one another spatially.

12. An optical system for a virtual retinal display, comprising:
a projector unit including:
an illumination device including:
a first laser diode configured to emit a first light beam within a first wavelength range, the first wavelength range changing depending on a temperature of at least one first laser cavity of the first laser diode,
a second laser diode configured to emit a second light beam within a second wavelength range, the second wavelength range changing depending on a temperature of at least one second laser cavity of the second laser diode,
a first sensor configured to acquire at least one piece of information concerning a current first wavelength range of the emitted first light beam, and
a control unit configured to determine the current first wavelength range depending on the information acquired by the first sensor concerning the current first wavelength range, wherein the control unit is configured to turn on the first laser diode at a first point in time, and to turn off the first laser diode at a second point in time following the first point in time, depending on a comparison of a first wavelength value of the determined current first wavelength range with a first wavelength threshold value, and to turn on or leave on the second laser diode, wherein the control unit is configured to select the first wavelength threshold value such that the first light beam emitted by the first laser diode or the second light beam emitted by the second laser diode always lies within a third, constant wavelength range; and
a first controllable deflection unit for the at least a first light beam or the second light beam configured to provide scanning projection of image content; and
a redirecting unit to which the image content can be projected and which is configured to direct the projected image content onto an eye of a user.

13. The optical system according to claim 12, wherein the redirecting unit is a holographic optical element having a defined diffraction efficiency range, and wherein the third, constant wavelength range overlaps with the diffraction efficiency range of the holographic optical element such that the at least the first or second light beam incident upon the holographic optical element is directed toward the eye of the user at least with a determined, defined diffraction efficiency.

14. The optical system according to claim 13, wherein the optical system further comprises a third temperature sensor configured to sense a surface temperature of the holographic optical element, and wherein the control unit is configured to also select the first and/or second wavelength threshold depending on the surface temperature of the holographic optical element sensed by the third temperature sensor.

15. The optical system according to claim 12, wherein the optical system is configured as a pair of smart glasses.

16. A method for turning on or turning off a first laser diode and/or a second laser diode of an illumination device, rein the method comprises the following method steps:
turning on the first laser diode of the illumination device to emit a first light beam within a first wavelength range at a first point in time using a control unit of the illumination device, wherein the first wavelength range changes depending on a temperature of at least one first laser cavity of the first laser diode;
turning off the first laser diode at a second point in time following the first point in time using the control unit, depending on a comparison of a first wavelength value of a current first wavelength range, determined by the control unit, of the first light beam emitted by the first laser diode with a first wavelength threshold value; and
turning on or leaving on the second laser diode of the illumination device to emit a second light beam within a second wavelength range (at the second point in time using the control unit, depending on the comparison of the first wavelength value with the first wavelength threshold value;
wherein the control unit selects the first wavelength threshold value such that the first light beam emitted by the first laser diode or the second light beam emitted by the second laser diode always lies within a third, constant wavelength range.

* * * * *